United States Patent [19]

Penhasi

[11] 4,418,950

[45] Dec. 6, 1983

[54] MOTION SENSING APPARATUS

[75] Inventor: Harry A. Penhasi, Cupertino, Calif.

[73] Assignee: Beckman Instruments, Inc., Fullerton, Calif.

[21] Appl. No.: 223,596

[22] Filed: Jan. 9, 1981

[51] Int. Cl.³ .............................................. E05C 3/14
[52] U.S. Cl. .................................. 292/144; 292/113; 292/1
[58] Field of Search ............... 292/113, 144, 201, 210, 292/336.3, 202–207, 106

[56] References Cited

U.S. PATENT DOCUMENTS 4,076,288  2/1978  Schwab .............................. 292/113

Primary Examiner—Richard E. Moore
Attorney, Agent, or Firm—R. J. Steinmeyer; F. L. Mehlhoff; Al A. Canzoneri

[57] ABSTRACT

A safety latching apparatus for a cover of a machine enclosing a round rotatable member. The apparatus includes a latch member, and an elongated flexible control element for sensing the motion of the rotatable member to automatically prevent opening of the cover when the member is rotating. The control element is movable longitudinally so that one of its ends can be brought into contact with the rotatable member and the other end connected to a latching mechanism located adjacent the machine cover. When the rotatable member is stationary, the end of the control element brought into contact with it remains generally rigid to a force in the longitudinal direction allowing the latch member to move to an unlocked position. When the rotatable member is rotating, the contact end of the control element is deflected to one side presenting no rigidity to a force in the longitudinal direction permitting the other end of the control element to recede from its rigid position and thereby prevent the latch member from moving to an unlocked position. An anti-flexing guide member is positioned alongside the contact end of the elongated member to assure that it remains generally rigid when the rotatable member is stationary, and the contact end is located so that its longitudinal axis is slightly to one side of a center line intersecting the central axis of the rotatable member in order to bias the contact end toward deflection in the direction of the anti-flexing guide and opposite the direction in which the rotatable member rotates.

4 Claims, 4 Drawing Figures

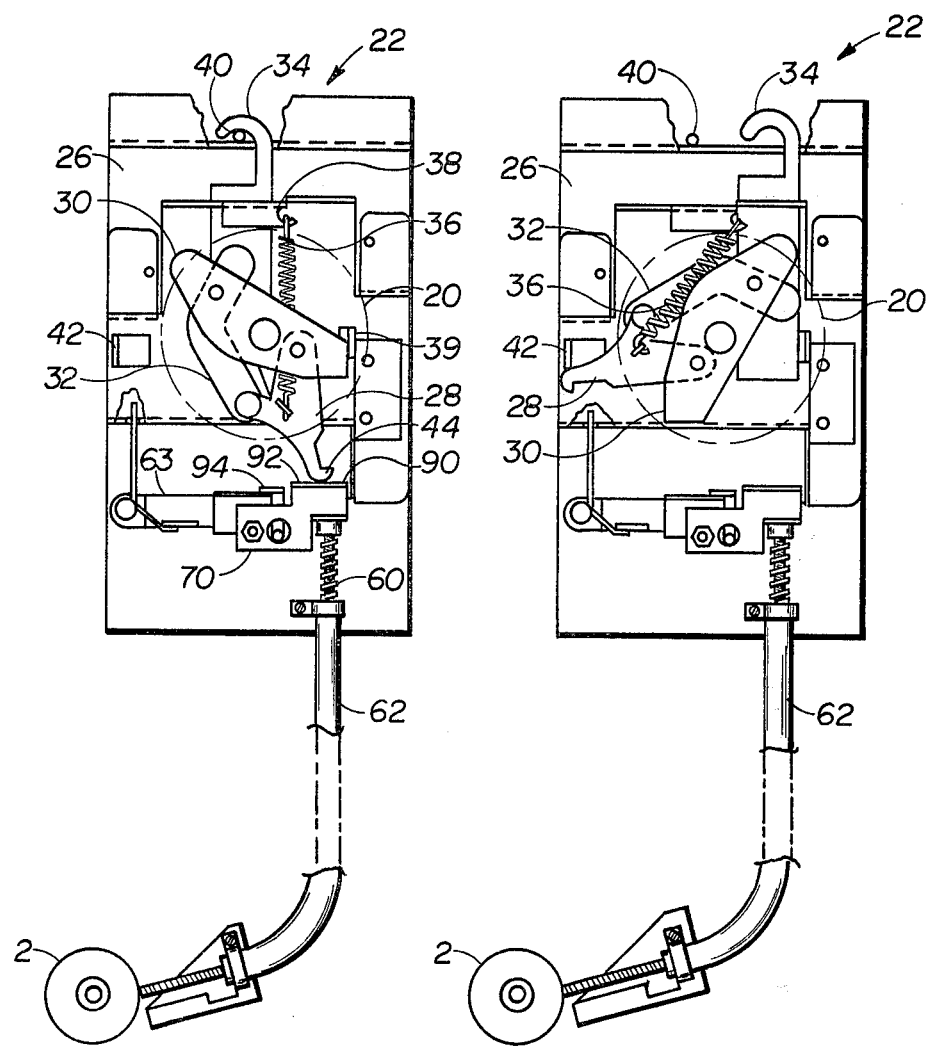

MOTION SENSING APPARATUS

BACKGROUND OF THE INVENTION

This invention is related to the field of latching mechanisms and, more particularly, is related to the field of latching mechanisms which prevent the opening of a cover or guard over a rotatable member, such as a centrifuge rotor, when it is in motion.

An extremely important safety consideration with respect to the operation of the centrifuge is to prevent opening of the cover while the rotor is still in motion, as inadvertent contact with a rotor turning at high speed could have serious consequences. Also, while the cover is open, the operator is exposed to a safety hazard in that the sample holding test tubes in the rotor could break and send fragments out of the centrifuge at high speed.

A practical motion-sensing safety lock for use in a machine having a rotatable member is disclosed by Christopher Morrison Schwab in U.S. Pat. No. 4,076,288, assigned to Beckman Instruments, Inc., the assignee of the present invention. Schwab teaches the use of a control element for sensing the rotation of the rotatable member within a machine to automatically prevent opening of a cover or guard on the machine when the member is rotating. The control element has one of its ends brought into contact with a portion of the rotatable member and its other end connected to a latching mechanism located adjacent the machine cover. The control element, being an elongated flexible member, moves in response to the rotation of the rotatable member. When the rotatable member is stationary, one end of the control element abuts the rotatable member at a point substantially in line with the member's central axis, causing the control element to become an elongated rigid member to permit the latching mechanism to turn and allow the opening of the cover over the rotatable member. When the member is rotating, the contact end of the control element adjacent the member is deflected, causing the other end of the control element connected to the latching mechanism to recede from its rigid position and prevent the movement of the latching mechanism and thereby retain the cover in a locked condition over the rotating member.

SUMMARY OF THE INVENTION

The present invention provides an improved safety latching apparatus for preventing the opening of an access cover to a machine having a rotatable member. The apparatus includes a latch member movable between a locked and unlocked position, and an elongated flexible control element having one end interacting with the latch member and the other end located adjacent the rotatable member. The control element has a single, generally uniform, elongated configuration throughout its length and is movable longitudinally. The end adjacent the rotatable member moves between a first position abutting the surface of the rotatable member when the member is stationary, and a second position deflected to one side when the member is rotating. When in the first position, the control element is generally rigid to a force in the longitudinal direction, which allows the latch member to move from the locked to the unlocked position. To assure that the end of the control element abutting the rotatable member remains rigid in the first position, an anti-flexing guide member is positioned along the side of the end in the direction opposite the direction the end is intended to be deflected by the rotatable member. In addition, the end is located so that its longitudinal axis is laterally displaced a slight distance in the direction opposite to the direction of intended deflection from a line intersecting the central axis of the rotatable member. This has the effect of biasing the end toward deflection in the direction of the displacement and the anti-flexing guide, thereby assuring that the end of the control element remains rigid while the rotatable member is stationary.

BRIEF DESCRIPTION OF THE DRAWINGS

FIG. 1 is a schematic view of the latching apparatus when the rotatable member is stationary and the latching mechanism is unlocked.

FIG. 2 is a schematic view of the latching apparatus when the rotatable member is stationary and prior to actuation of the latch knob.

DETAILED DESCRIPTION

Figure 3:
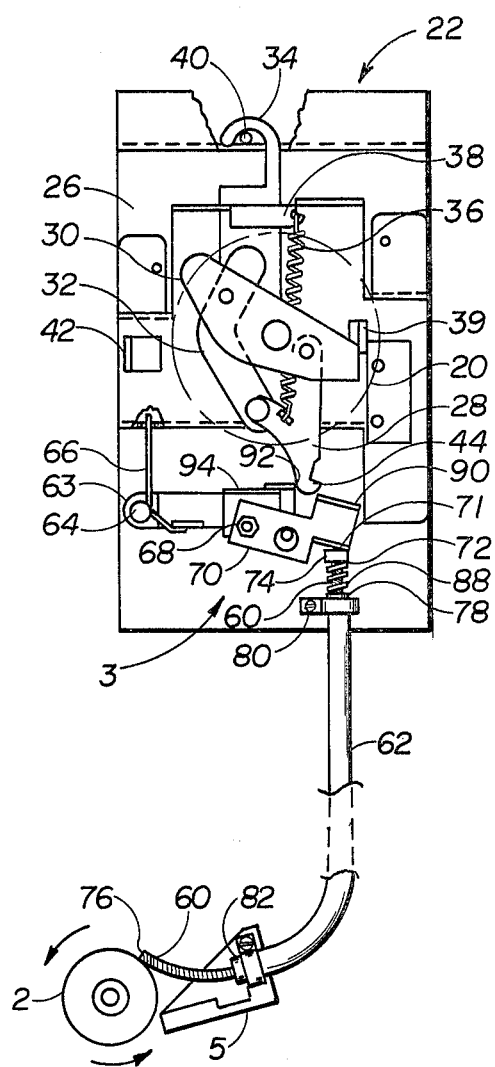
FIG. 3 is a schematic view of the latching apparatus in the locked position when the rotatable member is rotating and the latch knob has been actuated.

In FIG. 1 the rotatable member 2 is stationary and the latching mechanism 22 is shown in the unlocked condition. The locking hook 34 is disengaged from the latch bar 40 which is mounted on a cover (not shown) to be latched. The latching mechanism 22 includes a base plate 26 on which is mounted a turning arm 28 connected to a knob connecting plate 30. A latch knob 20 (shown in phantom lines) connects with the knob connecting plate 30, and is used to impart a clockwise turning motion to the connecting plate 30 in order to unlock the latching mechanism 22. The turning arm has an arcuate link 32 which connects with the locking hook 34. A coil spring 36 is connected between the turning arm 28 and a fixed flange 38 attached to the base plate 26. In the position shown in FIG. 1, the coil spring 36 tends to cause the turning arm 28 to move in a clockwise direction, but a stop flange 42 located on the base plate 26 limits the travel of the turning arm 28 in this direction.

In FIG. 2, the rotatable member is still stationary, but the latch knob 20 has been manually rotated in a clockwise direction to latch the latching mechanism 22. In this action, the knob connecting plate 30 has been rotated to its extreme clockwise position to contact the limit flange 39 which prevents continued travel in that direction. This rotation of the connecting plate 30 causes the turning arm 28 to also swing in a clockwise direction until, at some point in its travel, a counterclockwise pulling force is exerted on it by the coil spring 36. At the same time, because the locking hook 34 is connected to the turning arm 28 through the arcuate link 32, the locking hook 34 will be caused to move downward and laterally to the left so that the locking hook 34 engages the latch bar 40, thus locking the cover of the machine.

Referring now to FIG. 3, the latching mechanism 22 is shown in the latched condition, but the rotatable member 2 is now shown in motion. Under these conditions, the cover cannot be unlatched by actuation of the latch knob 20, because the safety lock 3 portion of the latching mechanism 22 will be activated by the control element 60 which is sensitive to motion. The control element 60 is designed to detect any rotation of the rotatable member 2 in the counterclockwise direction and to thereupon prevent opening of the machine cover. The control element 60 is slidably mounted within a sheath 62, extending between a position adjacent the rotatable member 2 and a position adjacent the safety lock 3 portion of the latching mechanism 22. A close tolerance relationship is maintained between the control element 60 and the inside of the sheath 62 to prevent any relative buckling or bending of the control element 60 during its sliding movement within the sheath 62.

The safety lock 3 includes a stop lever 63 pivotally mounted on the base plate 26 and slightly biased in a counterclockwise direction about the pivot pin 64 by the spring 66. Pivotally mounted at a pivot junction 68 on the stop lever 63 is a reaction lever 70 which has a flanged surface 71 in contact with a retaining cap 74 secured to the latching mechanism end 72 of the control element 60. One end 78 of the sheath 62 is mounted by a clamp fastener 80 to the base plate 26 of the latching mechanism 22. The other end 82 of the sheath 62 is clamped to the anti-flexing guide 5 which is located adjacent the rotatable member 2. In FIG. 3 the latching mechanism end 72 of the control element 60 is biased against the reaction lever 70 by a spring 88. One end of the spring 88 seats on the clamp fastener 80 and the other end seats on the retaining cap 74 mounted on the end 72 of the control element 60 and thereby serves to keep the retaining cap 74 in engagement with the reaction lever 70. In addition, the spring 88 keeps the contact end 76 of the control element 60 out of contact with the rotating member 2 until the latch knob 20 is actuated.

As shown in FIG. 2, the stop lever 63 has a ledge 94 designed to contact the notched end 44 of the turning arm 28 when the turning arm 28 moves to or from its unlocked position. Similarly, the reaction lever 70 has a guide ledge 90 which is contacted by the notched end 44 of the turning arm 28. In addition, the stop lever 63 has a limit edge 92 which prevents movement of the turning arm 28 toward its unlocked position when the rotatable member 2 is in motion as illustrated in FIG. 3 and as will be further explained below.

It should be noted that, as the turning arm 28 moves from the locked position to the unlocked position (shown in FIG. 2 and FIG. 1, respectively), the notched end 44 tends to pivot the reaction lever 70 slightly, in the direction of the latching mechanism end 72 of the control element 60. This movement occurs as the turning arm 28 swings through a lower point in the arc it traverses on the base plate 26 and so, slightly depresses the reaction lever 70. As a consequence, when the user begins turning the latch knob 20, the slight pivoting motion of the turning arm 28 brings the contact end 76 of the control element 60 into contact with the rotatable member 2. The contact end 76 of the control element 60 is only brought to contact with the rotatable member 2 by the initial turning of the latch knob 20. If the rotatable member 2 is stationary, as shown in FIG. 2, the contact end 76 of the control element 60 will abut the rotatable member 2 in a first engaging position causing the control element 60 to act as a rigid member throughout its length to permit the latching mechanism end 72 of the control element 60 to support the reaction lever 70 against rotation about its pivot junction 68 and thereby allow the turning arm 28 to be moved to an unlocked position as shown in FIG. 1. If the rotatable member 2 is moving, as shown in FIG. 3, the contact end 76 of the control element 60 will deflect against the rotatable member 2 in a second engaging position, causing the control element 60 to recede in a direction away from turning arm 28. This allows the reaction lever 70 to pivot further around the junction 68, exposing the limit edge 92 of the stop lever 63 which will block the turning arm 28 from moving to the unlocked position shown in FIG. 1.

Figure 4:
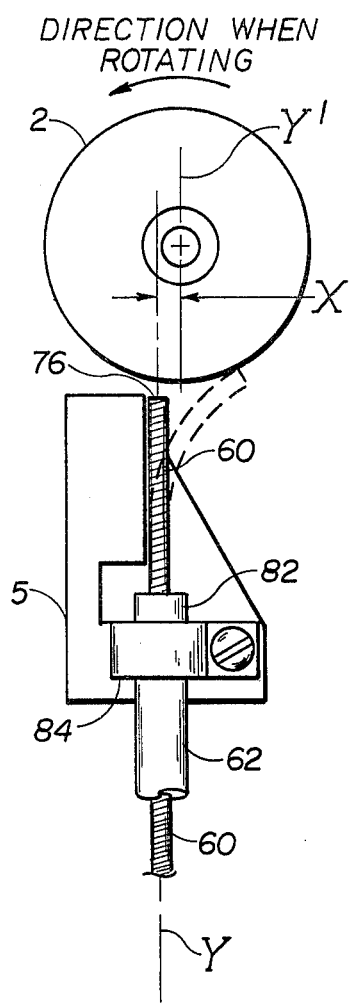
FIG. 4 is a plan view showing the antiflexing guide member and the position of the control element with respect to the rotational axis of the rotatable member.

Turning now to the operation of the control element with respect to the rotatable member, reference is made to FIG. 4. FIG. 4 shows the control element 60 slidably disposed in its sheath 62 which is secured at the end 82 to the anti-flexing guide 5 by the clamp 84. As stated previously, the end 76 of the control element 60 does not contact the rotatable element until the position of the control element 60 is extended by actuation of the latch knob 20.

Although somewhat exaggerated for the sake of clarity, FIG. 4 shows that the longitudinal axis Y of the control element 60 is offset from the line Y' which intersects the central axis of the rotatable member 2. It will be noted that the axis Y is approximately parallel to the line Y' and that the direction of the offset X is opposite the direction in which the control element 60 is intended to deflect. Accordingly, a bias for deflection in the direction of the offset is imparted to the control element, but deflection in this direction is prevented by the anti-flexing guide 5. As a consequence, the control element 60 can only be deflected when the rotatable member 2 is in motion since the energy of that motion is needed to overcome the bias for deflection in the direction opposite the rotation. This assures that the control element will remain rigid when the rotatable member is stationary. To illustrate this point, let the result be considered where the nominal position of the control element 60 is moved to the right with respect to FIG. 4 so that the longitudinal axis Y of the control element 60 is coincident with the center line Y' of the rotatable element 2. In this condition, the control element 60 would have a neutral bias, which is to say, that it would have no predisposition to deflect in either direction. But, given the possibility that small errors in positioning the control element 60 will arise because of manufacturing tolerances, it will be seen that a mislocated control element would tend to impart a turning force upon the rotatable member 2. If the drive system associated with the rotatable member 2 were of a low friction, low inertia character, then the rotatable member 2 could be turned by the force exerted on it. The result of this action would be that the control element would be deflected, thereby activating the safety lock 3 portion of the latching mechanism 22 shown in FIG. 3. Thus, it will be seen that the arrangement of the present invention would preclude the occurrence of this condition. The embodiment herein depicted is adapted for use in small (table-top size), high speed centrifuges whereby an offset dimension X ranging from zero to 0.125 inch is preferred. Variation of scale or material alter dimensional requirements accordingly.

While the invention has been described in what is conceived to be its most practical form, it will be apparent that the specific embodiments described herein may be altered or changed by those skilled in the art without departing from the true spirit and scope of the invention which is defined in the appended claims.

What is claimed is:

1. In a safety latching apparatus for a cover of a housing enclosing a round rotatable member including a latch member mounted on one of said cover and said housing and movable between a locked position and an unlocked position, and an elongated flexible control element having one end interacting with said latch member and the other end located adjacent said rotatable member, said control element having a single generally uniform elongated configuration between said one end and said other end, said control element movable longitudinally so that said other end moves between a first position abutting the surface of said rotatable member when said rotatable member is stationary and a second position deflected to one side of said rotatable member when said rotatable member is rotating, said control element being generally rigid to a force in the longitudinal direction when said other end is in said first position allowing said latch member to move to said unlocked position and presenting no rigidity to a force in the longitudinal direction when said other end is deflected to said second position permitting said one end to recede slightly and thereby preventing said latch member from moving to an unlocked position, the improvement comprising:

means for assuring that said other end remains generally rigid when in said first position abutting the surface of said round rotatable member, said means including an anti-flexing guide member positioned along the side of said other end opposite the direction said other end is intended to be deflected by said rotatable member; and locating said other end so that the longitudinal axis of said other end is laterally displaced a slight distance in the direction opposite to the direction of intended deflection from a line intersecting the central axis of said rotatable member so that said other end when in said first position is biased toward deflection in the direction of displacement against said anti-flexing guide.

2. A safety latching apparatus as defined in claim 1 wherein said anti-flexing guide member further comprises means for retaining said other end of said control element longitudinally movable, but captive with respect to said anti-flexing guide member.

3. A safety latching apparatus as defined in claim 1 wherein the lateral displacement of said other end of said control element comprises a distance between zero and 0.125 inch.

4. A safety latching apparatus for a cover of a housing enclosing a round rotatable member including a latch member mounted on one of said cover and said housing and movable between a locked and an unlocked position, and an elongated flexible control element having one end interacting with said latch member and the other end located adjacent said rotatable member, said control element having a single generally uniform elongated configuration between one end and said other end, said control element movable longitudinally so that said other end moves between a first position abutting the surface of said rotatable member when said rotatable member is stationary and a second position deflected to one side of said rotatable member when said rotatable member is rotating, said control element being generally rigid to a force in the longitudinal direction when said other end is in said first position allowing said latch member to move to said unlocked position and presenting no rigidity to a force in the longitudinal direction when said other end is deflected to said second position permitting said one end to recede slightly and thereby preventing said latch member from moving to an unlocked position;

means for assuring that said other end remains generally rigid when in said first position abutting the surface of said round rotatable member, said means including an anti-flexing guide member positioned along the side of said other end opposite the direction said other end is intended to be deflected by said rotatable member; and locating said other end so that the longitudinal axis of said other end is laterally displaced a slight distance in the direction opposite to the direction of intended deflection from a line intersecting the central axis of said rotatable member so that said other end when in said first position is biased toward deflection in the direction of displacement against said anti-flexing guide; and an anti-flexing guide member further comprising means for retaining said other end of said control element longitudinally movable, but captive with respect to said anti-flexing guide member; and said lateral displacement of said other end of said control element comprising a distance between zero and 0.125 inch.

* * * * *